United States Patent
Leeke et al.

(10) Patent No.: US 6,551,062 B2
(45) Date of Patent: Apr. 22, 2003

(54) TURBINE AIRFOIL FOR GAS TURBINE ENGINE

(75) Inventors: Leslie Eugene Leeke, Burlington, KY (US); Sean Robert Keith, Fairfield, OH (US); Ronald Eugene McRae, Jr., Wyoming, OH (US); Richard William Albrecht, Jr., Fairfield, OH (US); David Alan Frey, West Chester, OH (US)

(73) Assignee: General Electric Company, Schenectady, NY (US)

( * ) Notice: Subject to any disclaimer, the term of this patent is extended or adjusted under 35 U.S.C. 154(b) by 73 days.

(21) Appl. No.: 09/943,526

(22) Filed: Aug. 30, 2001

(65) Prior Publication Data

US 2003/0044275 A1 Mar. 6, 2003

(51) Int. Cl.[7] .................................................. F01D 5/18
(52) U.S. Cl. ...................................... 416/97 R; 415/115
(58) Field of Search ......................... 415/115; 416/97 R, 416/96 R, 96 A

(56) References Cited

U.S. PATENT DOCUMENTS

| | | | |
|---|---|---|---|
| 4,128,928 A | * 12/1978 | Shotts et al. | 29/155 A |
| 4,601,638 A | 7/1986 | Hill et al. | 416/97 R |
| 5,102,299 A | * 4/1992 | Frederick | 415/115 |
| 5,378,108 A | 1/1995 | Zelesky | 416/97 |
| 5,383,766 A | * 1/1995 | Przirembel et al. | 416/92 |
| 5,931,638 A | 8/1999 | Krause et al. | 416/97 R |
| 6,174,135 B1 | 1/2001 | Lee | 416/97 R |
| 6,234,756 B1 | 5/2001 | Zelesky et al. | 416/97 R |
| 6,241,466 B1 | 6/2001 | Tung et al. | 415/115 |
| 6,402,470 B1 | * 6/2002 | Kvasnak et al. | 416/97 R |

* cited by examiner

*Primary Examiner*—Edward K. Look
*Assistant Examiner*—Ninh Nguyen
(74) *Attorney, Agent, or Firm*—Rodney M. Young; Pierce Atwood, Attorneys

(57) ABSTRACT

A hollow cooled turbine airfoil is provided having pressure and suction side walls and a plurality of trailing edge cooling passages that feed cooling air bleed slots at the trailing edge. The suction side wall has a selectively reduced thickness, which allows shortened trailing edge slots, improving trailing edge cooling.

5 Claims, 3 Drawing Sheets

TURBINE AIRFOIL FOR GAS TURBINE ENGINE

BACKGROUND OF THE INVENTION

The present invention relates generally to gas turbine engines, and more particularly to hollow air cooled airfoils used in such engines.

A gas turbine engine includes a compressor that provides pressurized air to a combustor wherein the air is mixed with fuel and ignited for generating hot combustion gases. These gases flow downstream to one or more turbines that extract energy therefrom to power the compressor and provide useful work such as powering an aircraft in flight. In a turbofan engine, which typically includes a fan placed at the front of the core engine, a high pressure turbine powers the compressor of the core engine. A low pressure turbine is disposed downstream from the high pressure turbine for powering the fan. Each turbine stage commonly includes a stationary turbine nozzle followed in turn by a turbine rotor.

The turbine rotor comprises a row of rotor blades mounted to the perimeter of a rotor disk that rotates about the centerline axis of the engine. Each rotor blade typically includes a shank portion having a dovetail for mounting the blade to the rotor disk and an airfoil that extracts useful work from the hot gases exiting the combustor. A blade platform, formed at the junction of the airfoil and the shank portion, defines the radially inner boundary for the hot gas stream. The turbine nozzles are usually segmented around the circumference thereof to accommodate thermal expansion. Each nozzle segment has one or more nozzle vanes disposed between inner and outer bands for channeling the hot gas stream into the turbine rotor.

The high pressure turbine components are exposed to extremely high temperature combustion gases. Thus, the turbine blades and nozzle vanes typically employ internal cooling to keep their temperatures within certain design limits. The airfoil of a turbine rotor blade, for example, is ordinarily cooled by passing cooling air through an internal circuit. The cooling air normally enters through a passage in the blade's root and exits through film cooling holes formed in the airfoil surface, thereby producing a thin layer or film of cooling air that protects the airfoil from the hot gases. Known cooling arrangements often include a plurality of openings in the trailing edge through which cooling air is discharged. These openings may take the form of holes, or of a pressure side bleed slot arrangement, in which the airfoil pressure side wall stops short of the extreme trailing edge of the airfoil, creating an opening which is divided into individual bleed slots by a plurality of longitudinally extending lands incorporated into the airfoil casting. These slots perform the function of channeling a thin film of cooling air over the surface of the airfoil trailing edge. Airfoils having such a pressure side bleed slot arrangement are known to be particularly useful for incorporating a thin trailing edge. In effect, the trailing edge thickness of the airfoil is equal to that of the suction side thickness alone. This is desirable in terms of aerodynamic efficiency. However, a very thin trailing edge typically results in a relatively long bleed slot, which reduces cooling effectiveness, because of mixing of the hot combustion gases flowing over the exterior of the blade with the cooling air flow passing through the slots. Accordingly, there is a need for improved cooling of airfoil trailing edges while maintaining the aerodynamic efficiency thereof.

BRIEF SUMMARY OF THE INVENTION

The above-mentioned need is met by the present invention, which provides a turbine airfoil having pressure and suction side walls and a plurality of trailing edge cooling passages that feed cooling air bleed slots at the trailing edge. The suction side wall has a varying thickness. The minimum thickness portion is positioned so as to allow shortened trailing edge slots, thereby improving trailing edge cooling.

The present invention and its advantages over the prior art will become apparent upon reading the following detailed description and the appended claims with reference to the accompanying drawings.

BRIEF DESCRIPTION OF THE DRAWINGS

The subject matter that is regarded as the invention is particularly pointed out and distinctly claimed in the concluding part of the specification. The invention, however, may be best understood by reference to the following description taken in conjunction with the accompanying drawing figures in which:

DETAILED DESCRIPTION OF THE INVENTION

Figure 1:
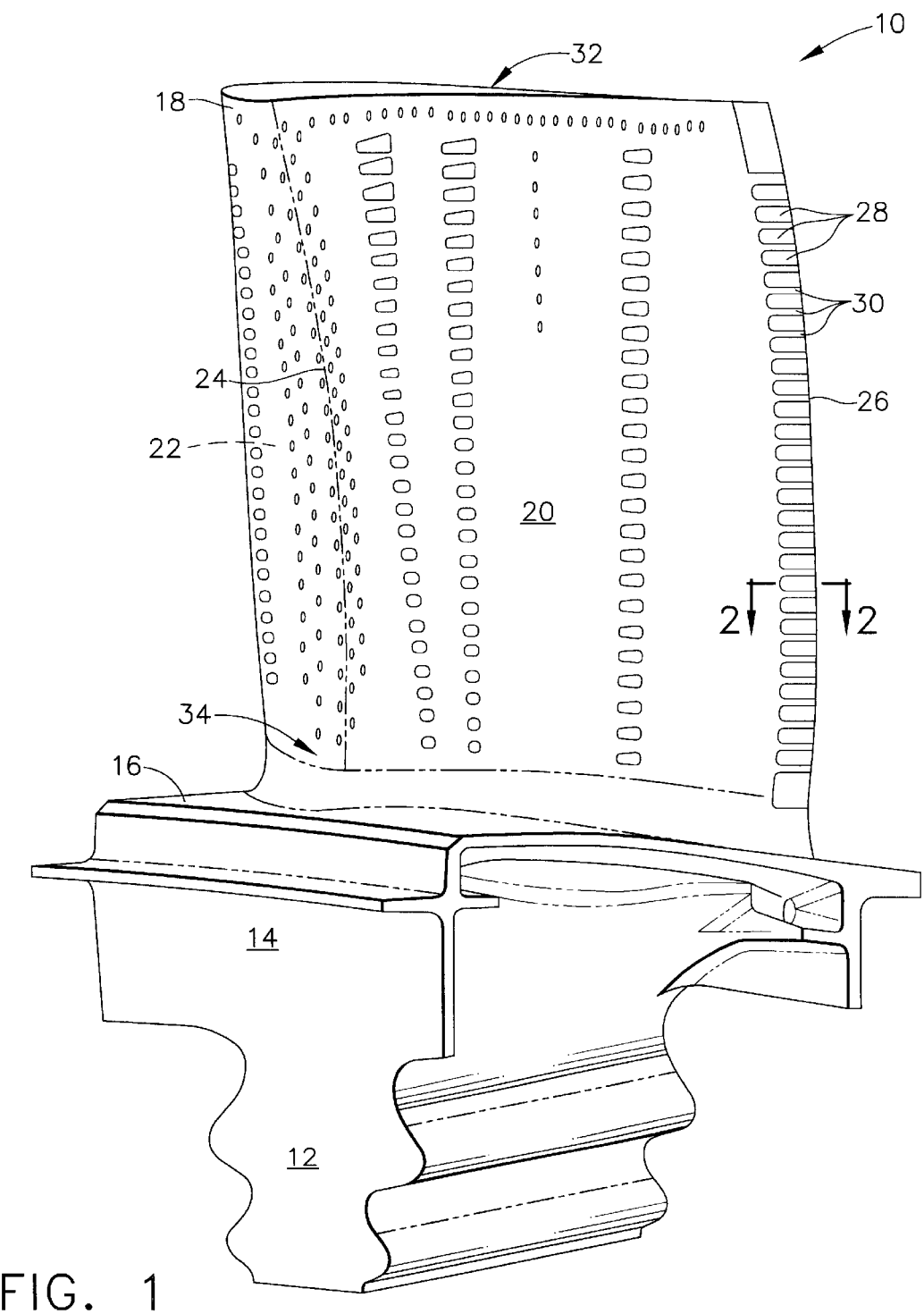
FIG. 1 is a perspective view of a turbine blade embodying the cooling configuration of the present invention.

Referring to the drawings wherein identical reference numerals denote the same elements throughout the various views, FIG. 1 illustrates an exemplary turbine blade 10. The turbine blade 10 includes a conventional dovetail 12, which may have any suitable form including tangs that engage complementary tangs of a dovetail slot in a rotor disk (not shown) for radially retaining the blade 10 to the disk as it rotates during operation. A blade shank 14 extends radially upwardly from the dovetail 12 and terminates in a platform 16 that projects laterally outwardly from and surrounds the shank 14. A hollow airfoil 18 extends radially outwardly from the platform 16 and into the hot gas stream. The airfoil 18 has a concave pressure side wall 20 and a convex suction side wall 22 joined together at a leading edge 24 and at a trailing edge 26. The airfoil 18 may take any configuration suitable for extracting energy from the hot gas stream and causing rotation of the rotor disk. The blade 10 is preferably formed as a one-piece casting of a suitable superalloy, such as a nickel-based superalloy, which has acceptable strength at the elevated temperatures of operation in a gas turbine engine. The blade incorporates a number of trailing edge bleed slots 28 on the pressure side 20 of the airfoil. The bleed slots 28 are separated by a number of longitudinally extending lands 30. At least a portion of the airfoil is typically coated with a protective coating 31 (FIG. 2), such as an environmentally resistant coating, or a thermal barrier coating, or both.

Figure 3:
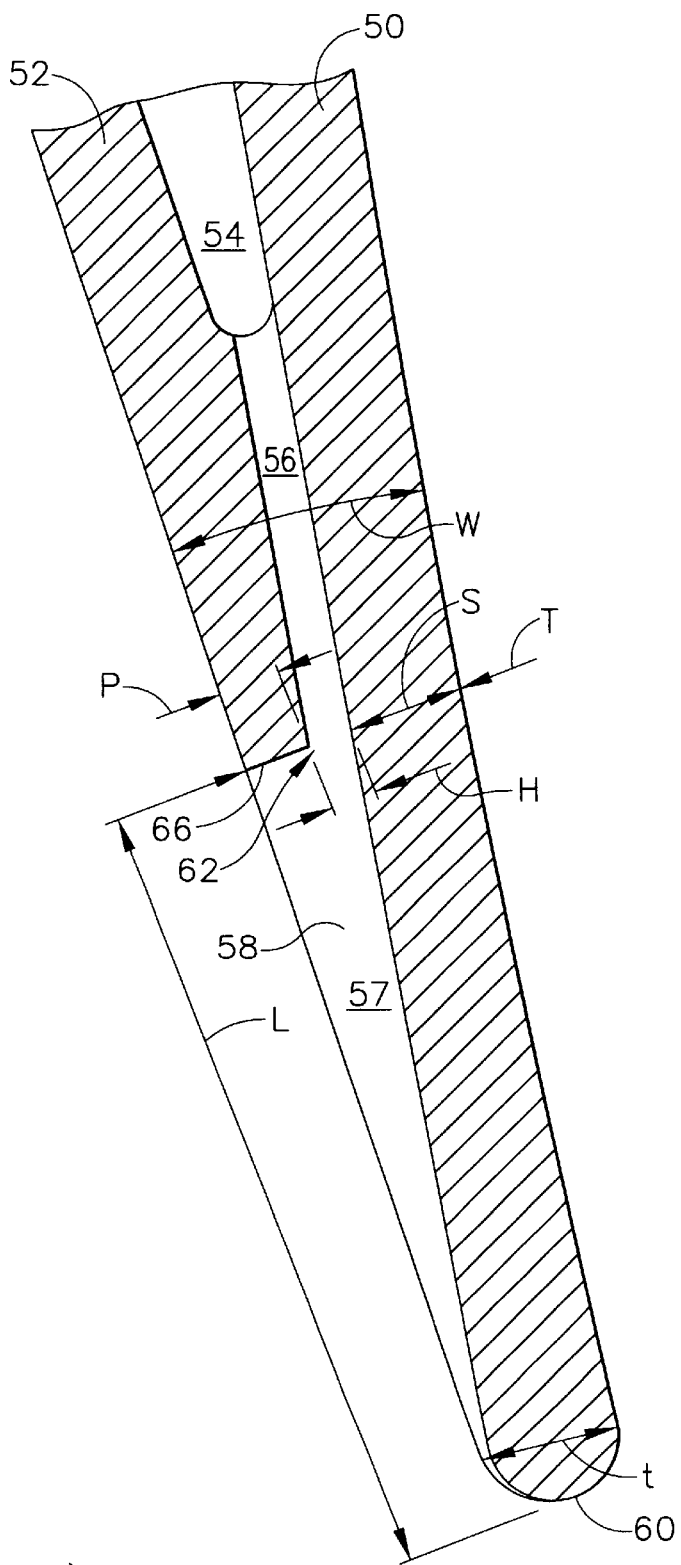
FIG. 3 is a partial cross-sectional view of a prior art turbine blade.

FIG. 3 illustrates a typical prior art arrangement of a portion of the trailing edge of a turbine blade. Pressure side wall 52 and suction side wall 50 are separated by an internal cavity 54. The side walls taper inwards toward the trailing edge 60. The suction side wall continues unbroken the entire length of the blade all the way to the trailing edge 60, whereas the pressure side wall 52 has an aft-facing lip 66 so as to expose an opening in the trailing edge 60, which is divided by lands 57 into a plurality of trailing edge slots 58. The aft-facing lip 66 defines the position of the trailing edge cooling passage exit 62. In this type of turbine blade, the trailing edge thickness at the aft end of the blade is essentially equal to the thickness of the suction side wall 50 alone, as described above.

The cooling effectiveness of the trailing edge slots 58 is related to their length L, which is the distance from the trailing edge cooling passage exit 62 to the trailing edge 60. This dimension is also sometimes referred to as the slot breakout distance. The longer the slot length L, the less is the trailing edge cooling effectiveness because the hot flowpath gases passing over the airfoil upstream of the extreme trailing edge tend to mix with the cooling air discharged from the trailing edge cooling passages 56. Effective cooling of the trailing edge 60 is especially important in high pressure turbine airfoil applications for life, durability, and reparability.

The trailing edge slot length L is controlled by several variables. The wedge angle W is the included angle between the outer surfaces of the airfoil and is typically measured towards the aft end of the airfoil, where the airfoil surfaces have the least curvature. The trailing edge thickness t is defined as the wall thickness at a predetermined small distance, for example 0.762 mm (0.030 in.), from the extreme aft end of the airfoil. The combination of the wedge angle W and the trailing edge thickness t determine the maximum overall airfoil thickness at each location along the aft portion of the airfoil. The overall airfoil thickness at the exit 62 of the trailing edge cooling passage 56 is denoted T and has a certain minimum dimension, as described more fully below. It would be possible to decrease the slot length L by increasing the wedge angle W, thus increasing dimension T. However, increasing wedge angle W and therefore the overall airfoil thickness would have a detrimental effect on aerodynamic performance. Dimension T is the sum of the pressure side wall thickness P, the suction side wall thickness S, and the trailing edge cooling passage width H. Reduction of dimensions P, S, or H would allow the slot length L to be reduced without increasing dimension T. However, there is a minimum trailing edge hole width H required in order to avoid excessive breakage of the ceramic cores used to produce the passages 56 during the casting process of the blade 10 and to provide the required cooling airflow. Also, there is a minimum thickness P required of the pressure side wall 52 and a minimum thickness S required of the suction side wall 50 for mechanical integrity.

Figure 2:
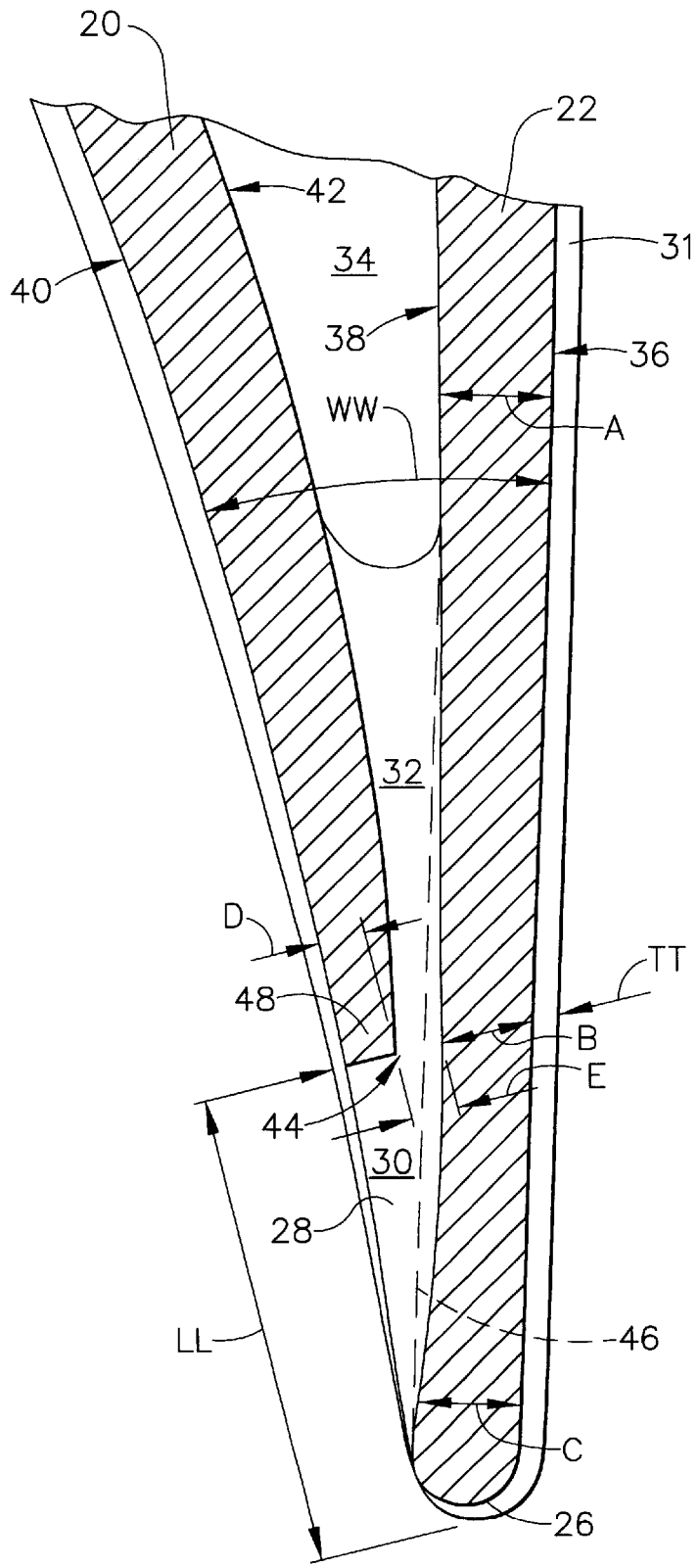
FIG. 2 is a partial cross-sectional view of a turbine blade taken along line 2—2 of FIG. 1.

The present invention, illustrated in FIG. 2, avoids these difficulties by selectively decreasing the suction side wall thickness. In the illustrated airfoil, an internal cavity 34 is bounded by pressure side wall 20 and suction side wall 22. The pressure side wall 20 has an outer or "hot" side 40 exposed to the flow of combustion gases and an inner or "cold" side 42. Likewise, the suction side wall has an outer or "hot" side 36 exposed to the flow of combustion gases and an inner or "cold" side 38. A trailing edge cooling passage 32 connects the internal cavity 34 with the trailing edge bleed slot 28 and is bounded by the cold side 42 of the pressure side wall 20 and the cold side 38 of the suction side wall 22. The trailing edge cooling passage is bounded in the radial direction by lands 30 (only one of which is shown in FIG. 2). The pressure side wall 20 has an aft-facing lip 48 defining the forward end of slot 28. In the exemplary embodiment shown, the wedge angle WW, pressure side wall thickness D, trailing edge passage width E, trailing edge thickness C, and the blade overall thickness TT at the trailing edge cooling passage exit 44 are unchanged relative to a nominal or baseline design. The thickness of the suction side wall 22 is smoothly varied so that the thickness near the trailing edge cooling passage exit 44 is less than the thickness at the inlet of the passage 32 and the trailing edge thickness C. In varying the suction side wall thickness, the hot side 36 of suction side wall 22 is not changed relative to the baseline design. Rather, the contour of the wall cold side 38 is modified. In this way, the external contour definition and thus the aerodynamic performance of the blade are unchanged from a baseline airfoil.

More specifically, The thickness A of the suction side wall 22 at a point upstream of the trailing edge cooling hole exit is a nominal thickness, which is determined taking into consideration the expected operating environment, including thermal, aerodynamic, and mechanical loads, and production process capability, including the possibility of "core shift" which is an effect caused by the movement of the ceramic cores used to define the interior dimensions of the blade during the casting process. Core shift can produce an unacceptability thin wall if allowances are not made for the effect. Within these constraints, the wall thickness is made as small as possible to minimize the material used, and thus the weight of the blade. A representative minimum value of dimension A may be about 0.737 mm (0.029 in.). The thickness of suction side wall 22 is smoothly tapered in a curved shape as it extends towards the trailing edge 26, resulting in a reduced thickness B at the axial location of the exit 44 of trailing edge cooling passage 32. This value is typically about 0.076–0.100 mm (0.003–0.004 in.) less than thickness A, or about 0.635–0.660 mm (0.025–0.026 in.).

In the exemplary embodiment illustrated, the minimum thickness of the suction side wall 22 occurs slightly aft of dimension B because of the natural taper of the suction side wall 22 upstream of the exit 44 and the method used to generate the wall contour. In the illustrated embodiment, the pressure side wall thickness D at the lip 48, the trailing edge cooling passage width E at the exit 44, and the trailing edge thickness C are all fixed. The contour of the suction side wall 22 is then extended rearward and subsequently a smooth curve is used to generate the intervening portion of suction side wall 22. However, the suction side wall minimum thickness could occur at the exit 44 or forward of the exit 44 if desired. Aft of the minimum thickness section, the thickness of suction side wall 22 is smoothly increased in the aft direction, until at the trailing edge 26, thickness C is equal to the baseline value dictated by the aerodynamic design (which is approximately equal to thickness A, but may also be greater than A). Thickness C may be about 0.737 mm (0.029 in.). The incorporation of a reduced thickness B of the suction side wall 22 while maintaining pressure side wall thickness D and trailing edge cooling hole width E reduces overall airfoil thickness TT (which is the sum of dimensions B, D, and E). This allows pressure side wall 20 to be extended rearward, moving the exit 44 of trailing edge cooling passage 32 towards the trailing edge 26 and reducing the slot length LL. The slot length LL could not be shortened in this manner without the curve section in pressure side wall 22, as can be seen by reference to the line marked 46 in FIG. 3, which represents a straight line tangent to pressure side wall 22 at the axial locations of dimensions A and C.

In an exemplary embodiment, the reduction in pressure side wall thickness B to about 0.635–0.660 mm (0.025–0.026 in.), or about 12% less than thickness A, allows a reduction in slot length LL of about 1.52 mm (0.060 in.), or about 32% of the baseline slot length. This can produce a significant reduction in trailing edge temperatures due to improved cooling. Analysis of this design indicates that the reduction in slot length by about 1.52 mm (0.060 in.) would reduce the expected temperature of the trailing edge by about 16° C. (30° F.), in comparison to the baseline design with an unchanged slot length. This specified value of thickness B would cause the wall thickness of production airfoils to approach the allowable minimum limits of in an area of the airfoil subject to appreciable core shift, for example at the location of thickness A. However, because the core used to produce the trailing edge cooling passage 32 during the casting process is better restrained near the trailing edge cooling passage exit 44 than at the upstream portion of the airfoil, the thickness B may be reduced below a nominal value without creating a risk of having an unacceptably thin wall. By incorporating a thin section B only where needed to accommodate the shorter slot length, the beneficial effect of a shortened slot is achieved while minimizing the risk to part integrity and production yield.

Because of the relatively large change in slot length LL permitted by a small change in thickness B, even a very small reduction in thickness B will enable the slot length LL to be reduced in a beneficial manner. Practically speaking, however, too small of a reduction in thickness B will be smaller than the variation in the dimensions that can be reliably produced in an actual airfoil. Accordingly, about 0.076 mm (0.003 in.) represents a practical minimum reduction of thickness B. However, to the extent that technologies become available to reliably produce reductions of less than this value, for example improved manufacturing processes, the benefit of the present invention would still be obtained, albeit to a lesser degree because of the lesser amount of shortening of the slot length LL. On the other hand, greater reductions of thickness B would allow further shortening of the slot length LL, resulting in additional temperature reductions. Reduction in the thickness B is practically limited. The thinner the wall, the greater the chances of part failure in manufacture or operation. Although the practical minimum thickness varies depending upon the particular airfoil and operating conditions, a representative extreme minimum value of B is about 0.038–0.051 mm (0.015–0.020 in.). To the extent that technologies in manufacturing and/or materials would enable the reliable production of thinner airfoil walls, this would allow the benefit of the present invention to be obtained through even further shortening of the slot length LL.

Additionally, because the trailing edge has a "club" shape caused by the curvature of the suction side wall 22 as described above, a projected area of the wall surface 38 downstream of the lip 48 is exposed to impingement of the cooling air flow from the slot 28, in addition to film cooling. This improves the heat transfer coefficient and reduces the temperature of the pressure side wall. The more pronounced the club shape, the greater the impingement effect.

The present invention has been described in conjunction with an exemplary embodiment of a turbine blade. However, it should be noted that the invention is equally applicable to any hollow airfoil, specifically including airfoils for stationary turbine nozzles (or vanes) as well as rotating blades.

The foregoing has described a turbine airfoil having improved cooling through incorporation of a shortened trailing edge slot. While specific embodiments of the present invention have been described, it will be apparent to those skilled in the art that various modifications thereto can be made without departing from the spirit and scope of the invention as defined in the appended claims.

What is claimed is:

1. An airfoil having a leading edge and a trailing edge, comprising:

a pressure side wall extending from said leading edge to said trailing edge;

a suction side wall extending from said leading edge to said trailing edge;

an internal cavity;

a slot disposed in said pressure side wall adjacent said trailing edge; and a passage disposed between said internal cavity and said slot, said passage having an inlet in fluid communication with said internal cavity and an exit in fluid communication with said slot, said passage being bounded by said pressure side wall and said suction side wall, wherein said suction side wall has an inner surface and a varying thickness, wherein the value of said thickness at said inlet and said trailing edge is greater than said thickness near said exit, wherein said thickness is at a minimum aft of said exit.

2. An airfoil having a leading edge and a trailing edge, comprising:

a suction side wall extending from said leading edge to said trailing edge;

a pressure side wall extending from said leading edge to said trailing edge and having an aft-facing lip near an aft end thereof;

an internal cavity;

a slot disposed in said pressure side wall adjacent said trailing edge; and a passage disposed between said internal cavity and said slot, said passage having an inlet in fluid communication with said internal cavity and an exit in fluid communication with said slot, said passage being bounded by said pressure side wall and said suction side wall, wherein said suction side wall has a curved inner surface such that the distance between said lip and said trailing edge is minimized for a given thickness of said lip and a given width of said passage at said exit, wherein the thickness of said suction side wall at said inlet and said trailing edge is greater than the thickness of said suction side wall near said exit.

3. An airfoil having a leading edge and a trailing edge, comprising:

a suction side wall extending from said leading edge to said trailing edge;

a pressure side wall extending from said leading edge to said trailing edge and having an aft-facing lip near an aft end thereof;

an internal cavity;

a slot disposed in said pressure side wall adjacent said trailing edge; and a passage disposed between said internal cavity and said slot, said passage having an inlet in fluid communication with said internal cavity and an exit in fluid communication with said slot, said passage being bounded by said pressure side wall and said suction side wall, wherein said suction side wall has a curved inner surface such that the distance between said lip and said trailing edge is minimized for a given thickness of said lip and a given width of said passage at said exit, wherein said thickness of said suction side wall is at a minimum at said exit.

4. An airfoil having a leading edge and a trailing edge, comprising:

a suction side wall extending from said leading edge to said trailing edge;

a pressure side wall extending from said leading edge to said trailing edge and having an aft-facing lip near an aft end thereof;

an internal cavity;

a slot disposed in said pressure side wall adjacent said trailing edge; and a passage disposed between said internal cavity and said slot, said passage having an inlet in fluid communication with said internal cavity and an exit in fluid communication with said slot, said passage being bounded by said pressure side wall and said suction side wall, wherein said suction side wall has a curved inner surface such that the distance between said lip and said trailing edge is minimized for a given thickness of said lip and a given width of said passage at said exit, wherein said thickness of said suction side wall is at a minimum aft of said exit.

5. An airfoil having a leading edge and a trailing edge, comprising:

a suction side wall extending from said leading edge to said trailing edge;

a pressure side wall extending from said leading edge to said trailing edge and having an aft-facing lip near an aft end thereof;

an internal cavity;

a slot disposed in said pressure side wall adjacent said trailing edge; and a passage disposed between said internal cavity and said slot, said passage having an inlet in fluid communication with said internal cavity and an exit in fluid communication with said slot, said passage being bounded by said pressure side wall and said suction side wall, wherein said suction side wall has a curved inner surface such that the distance between said lip and said trailing edge is minimized for a given thickness of said lip and a given width of said passage at said exit, wherein said thickness of said suction side wall is at a minimum forward of said exit.

* * * * *